United States Patent [19]
Johnston

[11] 3,957,087
[45] May 18, 1976

[54] PIN AND TRUSS CYLINDER CONSTRUCTION

[76] Inventor: Henry M. Johnston, Rte. 1, Enfield, Maine 04433

[22] Filed: July 3, 1974

[21] Appl. No.: 485,709

[52] U.S. Cl. ............................ 138/178; 29/121 R; 52/653; 138/175; 138/176; 138/177
[51] Int. Cl.² .......................................... F16L 9/00
[58] Field of Search ............ 138/178, 177, 174, 175, 138/176; 29/121 R; 198/230, 190; 52/653, 654

[56] References Cited
UNITED STATES PATENTS

| | | | |
|---|---|---|---|
| 780,789 | 1/1905 | Gardner | 138/175 |
| 3,445,905 | 5/1969 | Spencer | 29/121 R |
| 3,526,441 | 9/1970 | Schulz | 277/92 |
| 3,668,876 | 6/1972 | Koehler | 52/653 |
| 3,773,614 | 11/1973 | Pennington | 29/121 R |

Primary Examiner—Richard E. Aegerter
Assistant Examiner—L. Footland

[57] ABSTRACT

A strong modular cylinder is made to a selected length by using rods through rings and spacers to tension the cylinder and helical truss rods to give further strength. The ring configuration provides a large open area which can be compartmented for adaptations such as of suction or vacuum boxes.

7 Claims, 7 Drawing Figures

PIN AND TRUSS CYLINDER CONSTRUCTION

The present invention relates to a pin and truss cylinder construction.

In many industrial uses, such as papermaking, textiles and chemicals, cylinders are used. In many instances, such cylinders must allow for free access to the inner portion of the cylinder for passage of liquids on gases. Cylinders also must have structural strength. Longevity, repairability and cost of cylinders are additional factors considered with regard to cylinders selected for particular jobs. Many cylinders are covered with mesh and used as filtering media.

Especially where drainage is required, the interior must be free of impediments to avoid clogging.

In the past, cylinders have been mounted with shafts through one end, through spiders, or through spaced spiders. Such construction cannot receive a suction box nor have good drainage characteristics; they are heavy and expensive to manufacture.

Perforated plate cylinders of the past tend to crack, especially with temperature changes in vats, have poor drainage characteristics and are expensive.

Honeycomb cylinders without spiders depend greatly on their honeycomb structure for strength, are expensive and not particularly strong.

The present tendency is to construction with stainless steel, due to the anti-corrosive characteristics of this material. However, stainless steel tends to crack and break under flexing, from expansion, contraction and operational vibration. The pin truss cylinder is the only type which offers resiliency and thereby avoids fatigue, stress and corrosion cracking.

As shown in U.S. Pat. No. 3,445,905, a roll somewhat of the present configuration is prepared for a wire mesh covering by use of a helically wound reinforcing wire over which are placed longitudinal wires. These wires appear to be for a winding wire to receive mesh because of the support of the notched configuration to hold the winding wire. Such rolls, though, require more rigidity than the present invention and are more expensive to make.

According to the present invention, which is an advance over the prior art, a modular type cylinder is provided with support rings spaced apart with spacers holding the support rings by pins passing through the support rings and spacers. The cylinder is further trussed with single or double helical continuous truss rods which pass through the support rings. The helical truss rods may be welded at the support rings and/or at the spacers as they cross and the roll is compartmentable.

The cylinder of the present invention is very rigid under tension, yet resilient enough because of its construction, to greatly diminish the tendency to fatigue or break apart. Length is extendable without sagging. The cylinder of the present invention tends to be lighter than comparable cylinders, is inexpensive, strong and has excellent drainage characteristics, is fatigue resistant and is easily repaired or disassembled.

Although such novel feature or features believed to be characteristic of the invention are pointed out in the claims, the invention and the manner in which it may be carried out, may be further understood by reference to the description following and the accompanying drawings.

Referring now to the figures in greater detail, where like reference numbers denote like parts in the various figures.

Figure 1:
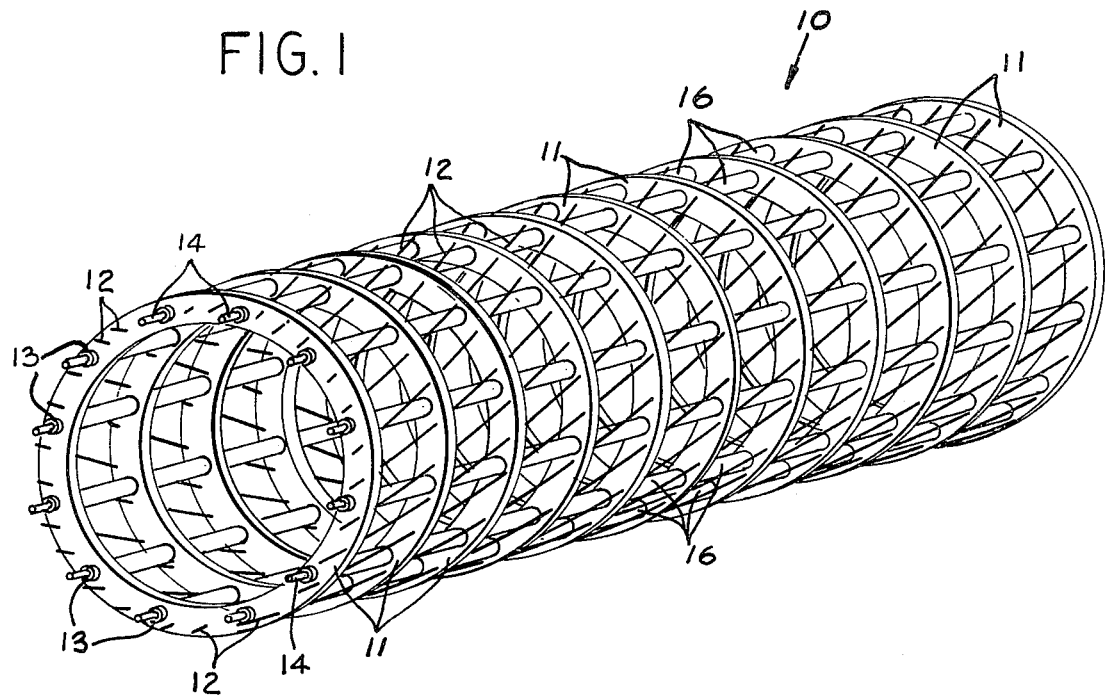
FIG. 1 is a perspective view of a pin and truss cylinder of the present invention.
Figure 2:
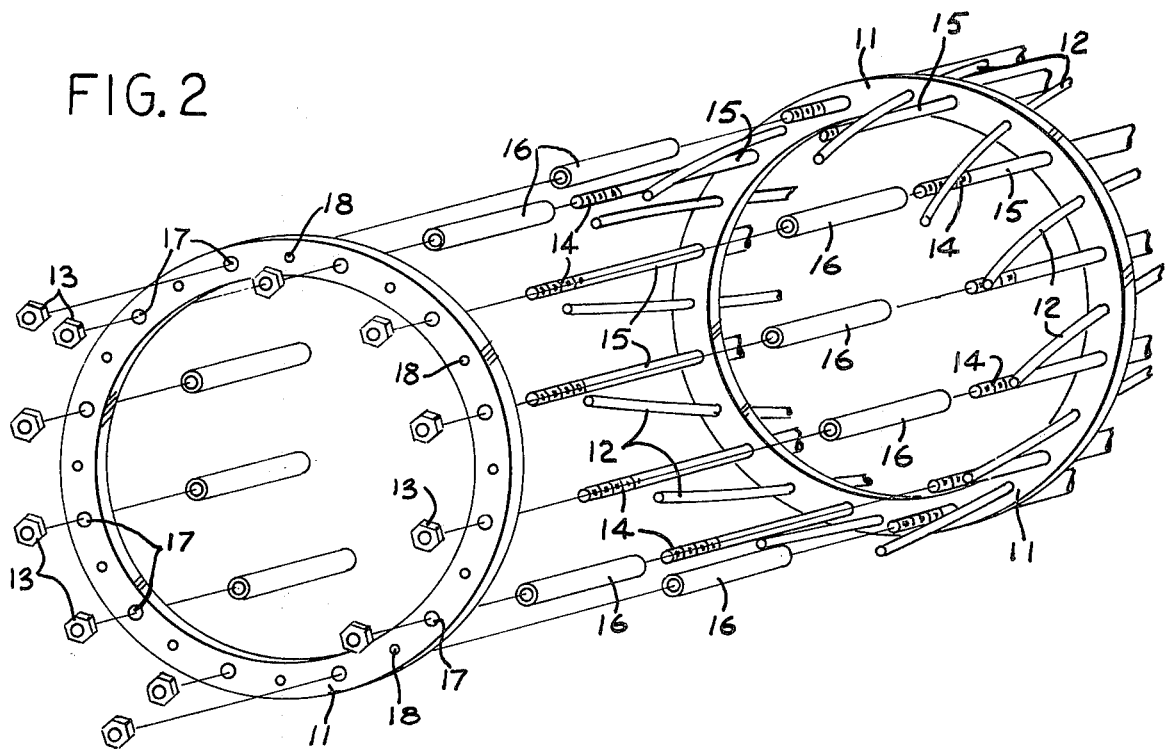
FIG. 2 is a partial exploded view of a section of the cylinder of the present invention between two support rings.

The pin and truss cylinder 10, as shown in FIG. 1, comprises spaced apart support rings 11, continuous truss rod 12 helically passing through the support rings 11, nuts 13 on the threaded ends 14 of continuous pin rod 15, as can be seen in FIG. 2.

The further end of the cylinder 10 (not shown) has the same ring 11, pin 15 and nut 13 configuration. The spacers 16 separate the rings 11, evenly spaced at a selected distance.

In FIG. 2 the nuts 13 can be seen exploded away from the ring 11 on the end of the cylinder 10. The continuous pin rod 15 has threaded ends 14 to receive the nuts 13. The continuous pin rod 15 passes through the spacers 16 between the rings 11.

The rings 11 have openings 17 through which the continuous pin rods 15 may pass and further openings 18 through which the helical continuous truss rods 12 may pass.

Figure 3:
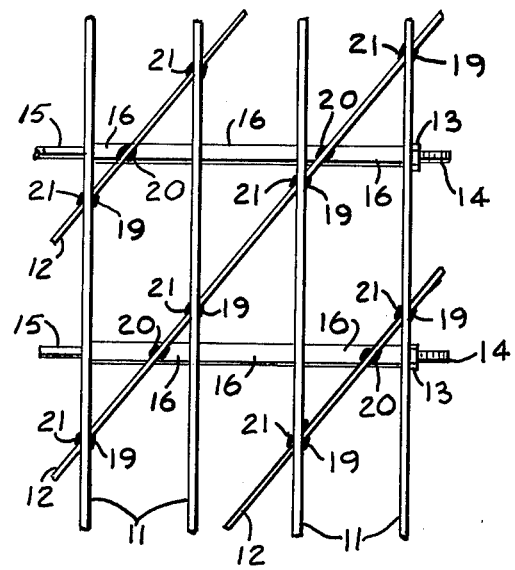
FIG. 3 is a partial plan view of support rings, pins, spacers and continuous truss rods.

In FIG. 3 a typical assembled welding configuration is shown. The continuous truss rods 12, each preferably fastened by having one weld 19 inside of a ring 11, a second weld 20 to a spacer 16 and a third weld 21 inside the next adjacent support ring 11. Such welding is simple to do and provides great stability.

Figure 4:
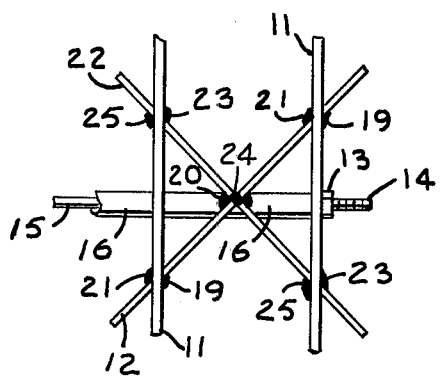
FIG. 4 is a detail such as shown in FIG. 3, using double continuous truss rods.

In FIG. 4 an enlarged detail of a pin truss cylinder of the present invention is shown with a crossing continuous truss rod 22. The crossing truss rod 22 passes through openings (not shown) in the support rings 11, and is joined to the support rings 11 by an inside weld 23, a weld 24 to the truss rod 12, if desired, and a third weld 25 inside the next adjacent support ring 11.

Figure 5:
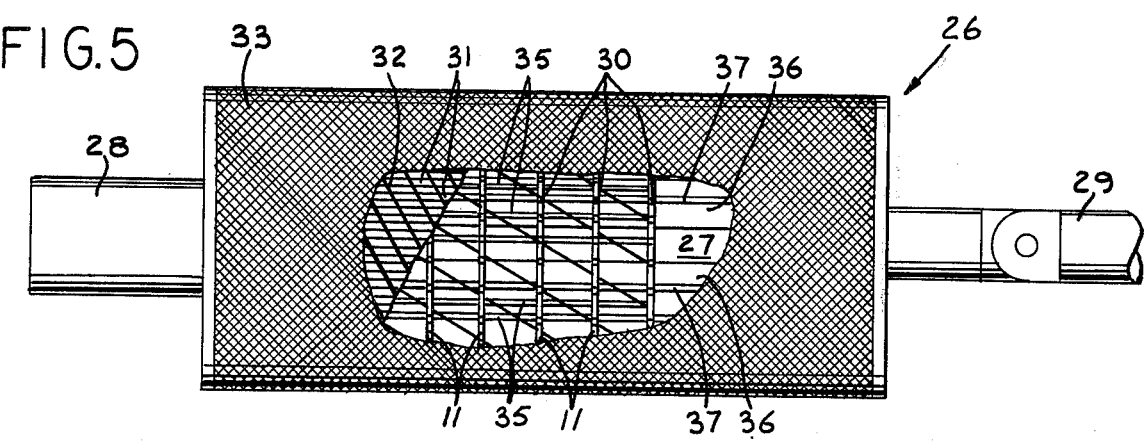
FIG. 5 is a cut-away plan view of a cylinder of the present invention with top rods, winding wire and mesh, showing a suction box.
Figure 7:
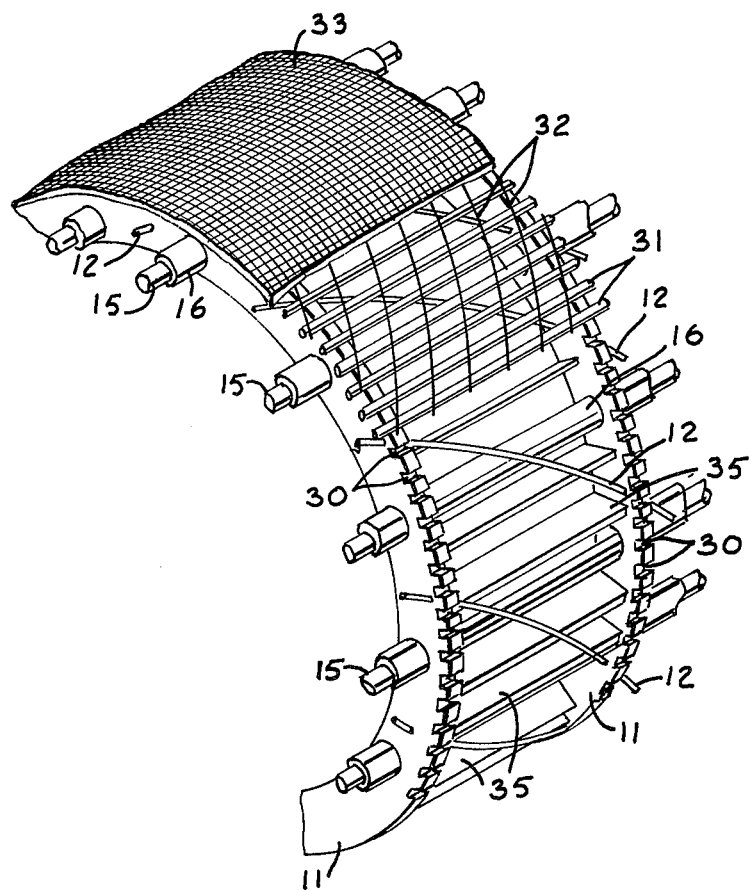
FIG. 7 is a detail of a baffled compartment of the cylinder of FIG. 5.

FIG. 5 shows a roll 26 pin truss cylinder of the present invention. In the cut away can be seen a suction box 27 inside the support rings 11. A vacuum connector 28 extends from the roll 26 at one end and a direct drive shaft 29 extends from the roll 26 at the other end.

The pin truss cylinder 10 is compartmented with baffles 35 in order to prevent loss of vacuum and to facilitate removal of liquids or gasses via suction box 27. The lips 36 of the suction box 27 have seals 37 to help maintain a high vacuum as the roll 26 moves past the seals 37 and lips 36 of the suction box. The baffles 35 aid in maintaining a vacuum. The support rings 11 have peripheral indentations 30 which are optionally used to hold top rods 31, which extend the length of the roll 26. Around the top rods 31, as shown, is a winding wire 32, which is helically wound around the pin and truss cylinder of the roll 26, over which the mesh 33 is placed.

In making a pin truss cylinder of the present invention, the nuts 13 on the threaded ends 14 of the pin rods 15 are tightened against each other at both ends, tensioning the cylinder 10 (only one end is shown). The spacers 16, through which the pin rods 15 pass, both support and space the rings 11 and the cylinder 10. The continuous truss rods 12 provide a strength to the cylinder 10 without any clutter to the center of the cylinder 10 which can be used to hold a suction box 27, for instance.

Figure 6:
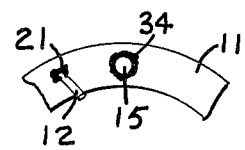
FIG. 6 is a detail of an alternate embodiment of FIG. 1 with a welded continuous pin rod.

Other tensioning methods can be employed and cylinders can be held together by welds 34, rather than nuts, as shown in FIG. 6.

The optional length of the pin and truss cylinder 10 does not have major limitations since the rigidity of construction of the cylinder 10 prevents sagging of the cylinder 10, unsupported, as shown, and provides great rigidity of the cylinder against torsion and wear fatique associated with torsion.

The cylinder 10 of the present invention is almost modular in nature. The only parts that change with the different length of cylinder 10 are the pin rods 15 which must be cut to size and usually threaded for each individual size cylinder 10.

Repair is facilitated since the rings 11 may be easily stripped off, the individual pin rods 15 may easily be replaced and truss rods 12 may be rethreaded through the openings 18 in the support rings 11.

In the roll 26, the top rods 31 serve as a support for the cylinder 10, as well as a base for the winding wire 32, which in turn supports the mesh 37.

The continuous truss rods 12 pass through and are welded to the support rings 11. The truss rods 12 are an integral part of the structural strength of the cylinder 10 of the present invention. They are not like the reinforcing wire welded to rings of the past or used as a base reinforcing member and a support for winding wire.

The top rods 31 in the indentations 30 of the rings 11, as shown in FIG. 5, provide structural strength to the whole cylinder 10 as well as forming a base for winding wire 32.

It is to be understood that the pin truss cylinder 10 configuration of the present invention may be used in pocket ventilation rolls, open breast rolls, suction couch rolls, table rolls, wet machine cylinders, thickeners, felters, washers, dryers and extractor rolls, to name a few.

The terms and expressions which are employed are used as terms of description; it is recognized, though, that various modifications are possible.

Having thus described certain forms of the invention in some detail, what is claimed is:

1. A pin and truss cylinder construction comprising a plurality of support rings, said support rings including regularly spaced pin rod openings therethrough and regularly spaced helical truss rod openings therethrough, a plurality of spacers, said spacers between at least two support rings, a plurality of pin rods, each said pin rod adapted to pass through at least some of said spacers and through said support rings and said pin rod openings, said pin rods threaded at each end and having nuts on said threads to tension said pin rods against said rings and spacers therebetween, said support rings and spacers and tensioned pin rods forming a cylindrical configuration, and a plurality of helical truss rods, each said helical truss rod adapted to pass through at least some of said support rings' helical truss rod openings, means to fasten said helical truss rods to the cylindrical configuration formed by said support rings and spacers and pin rods.

2. The invention of claim 1 wherein said helical truss rods are welded to said cylinder.

3. The invention of claim 1 wherein said support rings include a second set of helical truss rod openings and a second set of helical truss rods fastened to said cylinder.

4. The invention of claim 3 wherein said second set of truss rods are welded.

5. The invention of claim 1 wherein said support rings include a plurality of spaced indentations on their outer periphery.

6. The invention of claim 5, wherein said indentations are aligned on spaced-apart rings and are adapted to receive top rods.

7. The invention of claim 1 including a plurality of baffles spaced apart about said cylinder between at least two support rings.

* * * * *